United States Patent
Shen et al.

(10) Patent No.: US 11,540,263 B2
(45) Date of Patent: Dec. 27, 2022

(54) RESOURCE SCHEDULING METHOD AND DEVICE, AND COMPUTER STORAGE MEDIUM

(71) Applicant: GUANGDONG OPPO MOBILE TELECOMMUNICATIONS CORP., LTD., Dongguan (CN)

(72) Inventors: Jia Shen, Dongguan (CN); Yanan Lin, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 121 days.

(21) Appl. No.: 17/130,821

(22) Filed: Dec. 22, 2020

(65) Prior Publication Data

US 2021/0112531 A1 Apr. 15, 2021

Related U.S. Application Data

(63) Continuation of application No. PCT/CN2018/093367, filed on Jun. 28, 2018.

(51) Int. Cl.
*H04W 72/04* (2009.01)
*H04W 76/11* (2018.01)

(52) U.S. Cl.
CPC ..... *H04W 72/042* (2013.01); *H04W 72/0413* (2013.01); *H04W 72/0453* (2013.01); *H04W 76/11* (2018.02)

(58) Field of Classification Search
CPC ........... H04W 72/042; H04W 72/0413; H04W 72/0453; H04W 76/11; H04W 72/1289;
(Continued)

(56) References Cited

U.S. PATENT DOCUMENTS 11,121,756 B2 * 9/2021 Bae ...................... H04L 5/0098
11,223,452 B2 * 1/2022 Oh ........................ H04L 5/0053
(Continued)

FOREIGN PATENT DOCUMENTS

CN 101605356 A 12/2009
CN 101742626 A 6/2010
(Continued)

OTHER PUBLICATIONS

Guangdong OPPO Mobile Telecommunications Corp. Ltd., Extended European Search Report, EP18924933.7, dated Jun. 1, 2021, 8 pgs.
(Continued)

Primary Examiner — Brian T O Connor
(74) Attorney, Agent, or Firm — Morgan, Lewis & Bockius LLP (57) ABSTRACT

The embodiments of this application provide a resource scheduling method and device, and a non-transitory computer-readable storage medium. The method may comprise: receiving first configuration information, wherein the first configuration information comprises a resource allocation type corresponding to at least one radio network temporary identifier (RNTI) for scrambling downlink control information (DCI); after receiving the DCI, determining a target RNTI that scrambles the DCI; determining a resource allocation type corresponding to the target RNTI based on the target RNTI and the resource allocation type corresponding to the at least one RNTI for scrambling the DCI; and scheduling a resource according to the resource allocation type corresponding to the target RNTI.

13 Claims, 2 Drawing Sheets

(58) Field of Classification Search
CPC .... H04W 28/06; H04L 5/0058; H04L 5/0094; H04L 5/0053
See application file for complete search history.

(56) References Cited

U.S. PATENT DOCUMENTS

| | | |
|---|---|---|
| 2017/0215188 A1 | 7/2017 | Kim et al. |
| 2018/0042043 A1 | 2/2018 | Babaei et al. |
| 2019/0297607 A1* | 9/2019 | Kim ...................... H04L 5/0039 |
| 2020/0068537 A1* | 2/2020 | Oh ........................ H04W 72/04 |
| 2021/0007085 A1* | 1/2021 | Lin ..................... H04W 72/042 |
| 2021/0153267 A1* | 5/2021 | Zhang ............... H04W 72/1289 |
| 2021/0160917 A1* | 5/2021 | Goto ................... H04W 72/042 |
| 2021/0266944 A1* | 8/2021 | Noh .................. H04W 72/1273 |
| 2021/0320775 A1* | 10/2021 | Miao ..................... H04L 5/0094 |

FOREIGN PATENT DOCUMENTS

| | | |
|---|---|---|
| EP | 3422788 A1 | 1/2019 |
| WO | WO2017171525 A1 | 10/2017 |
| WO | WO2020000309 A1 | 1/2020 |

OTHER PUBLICATIONS

Guangdong OPPO Mobile Telecommunications Corp. Ltd., International Search Report and Written Opinion, PCT/CN2018/093367, dated Mar. 26, 2019, 14 pgs.

* cited by examiner

RESOURCE SCHEDULING METHOD AND DEVICE, AND COMPUTER STORAGE MEDIUM

CROSS REFERENCE TO RELATED APPLICATION

This application is a continuation application of PCT Application No. PCT/CN2018/093367, filed Jun. 28, 2018, the entire content of which is incorporated herein by reference in its entirety.

TECHNICAL FIELD

The embodiments of the present disclosure relate to the technical field of wireless communication, and in particular, to a method and device for scheduling a resource, and a non-transitory computer-readable storage medium.

BACKGROUND

In the current wireless communication system, a variety of frequency domain resource allocation types can be supported. In the 5th Generation (5G) New Radio (NR) system, three types of frequency domain resource allocation are currently supported, which are respectively type 0, type 1, and type 2. Among them, type 0 is non-continuous resource allocation based on bitmap, and type 1 is a continuous resource allocation. For these two frequency domain resource allocation types, they are generally semi-statically configured by using Radio Resource Control (RRC), or they are dynamically indicated through an indicator carried in a field of Downlink Control Information (DCI).

As can be seen from the above schemes for configuring or indicating the frequency domain resource allocation types, the semi-static configuration cannot achieve dynamic switching between multiple frequency domain resource allocation types, and cannot effectively support different types of services at the same time, which greatly limits the richness of the business and the business capabilities of 5G; and the indication through the DCI field will increase the signaling overhead of DCI.

SUMMARY

The embodiments of the present disclosure expect to provide a method and device for scheduling a resource and a non-transitory computer-readable storage medium; which can not only realize dynamic switching between multiple frequency domain resource allocation types, but also reduce DCI signaling overhead.

The technical solutions of the embodiments of the present disclosure may be implemented as follows.

In the first aspect, the embodiments of the present disclosure provide a method for scheduling a resource, the method is applied to a terminal device, and the method includes:

receiving first configuration information; wherein the first configuration information includes a resource allocation type corresponding to at least one radio network temporary identifier (RNTI) used for scrambling downlink control information (DCI);

after receiving the DCI, determining a target RNTI that scrambles the DCI;

determining the resource allocation type corresponding to the target RNTI based on the target RNTI and the resource allocation type corresponding to the at least one RNTI used for scrambling the DCI; and scheduling the resource according to the resource allocation type corresponding to the target RNTI.

In the second aspect, the embodiments of the present disclosure provide a terminal, including: a receiving part, a first determining part, a second determining part and a scheduling part; wherein the receiving part is configured to receive first configuration information; wherein the first configuration information includes a resource allocation type corresponding to at least one radio network temporary identifier (RNTI) used for scrambling downlink control information (DCI);

the first determining part is configured to determine a target RNTI that scrambles the DCI after the receiving part receives the DCI;

the second determining part is configured to determine the resource allocation type corresponding to the target RNTI based on the target RNTI and the resource allocation type corresponding to the at least one RNTI used for scrambling DCI; and the scheduling part is configured to schedule the resource according to the resource allocation type corresponding to the target RNTI.

In the third aspect, the embodiments of the present disclosure provide a terminal, including: a network interface, a memory and a processor; wherein the network interface is configured to receive and send a signal in a process of sending and receiving information with other external network element;

the memory is configured to store a computer program that can run on a processor;

the processor is configured to execute the steps of the method for scheduling a resource in the first aspect when the computer program is running.

In the fourth aspect, the embodiments of the present disclosure provide a non-transitory computer-readable storage medium storing a program for scheduling a resource, which when executed by at least one processor, implements the steps of the method for scheduling a resource in the first aspect.

The embodiments of the present disclosure provide a method and device for scheduling a resource, and a non-transitory computer-readable storage medium; the resource allocation type is indicated by DCI, so that dynamic scheduling for the resource allocation type can be realized. In addition, the specific indication method does not use the form of carrying the indicator by DCI, instead, the RNTI that scrambles the DCI is used to implicitly indicate the resource allocation type corresponding to the RNTI, thereby reducing the signaling consumption of DCI. It can be seen from this that the technical solution of the embodiment can not only realize dynamic switching between multiple frequency domain resource allocation types, but also reduce the DCI signaling overhead.

DETAILED DESCRIPTION

In order to understand the features and technical contents of the embodiments of the present disclosure in more detail, the following describes the implementation of the embodiments of the present disclosure in detail with reference to the accompanying drawings. The accompanying drawings are for reference only and are not intended to limit the embodiments of the present disclosure.

In the current related Long Term Evolution (LTE) or 5G communication system, three types of frequency domain resource allocation that can be supported are type 0, type 1, and type 2. The granularity of the resource allocation is Resource Block Group (RBG). The size of each RBG, which is the number of Resource Blocks (RBs) contained in one RBG, is related to the system bandwidth. Taking type 0 as an example, in a 5G NR system, type 0 is a non-contiguous resource allocation based on bitmap. Each bit in the bitmap represents one RBG. Table 1 shows a relationship between the RBG size and System Bandwidth of type 1 resource allocation.

TABLE 1

| System Bandwidth $N_{RB}^{DL}$ | RBG size (P) |
|---|---|
| ≤10 | 1 |
| 11-26 | 2 |
| 27-63 | 3 |
| 64-110 | 4 |

In the 5G NR system, type 1 is a continuous resource allocation, and the two types of frequency domain resource allocation, i.e., type 1 and type 0, can be semi-statically configured through RRC signaling, or dynamically indicated through an indicator carried in a field of DCI.

For type 0, two sets of mapping relationships from RBG size to the Bandwidth part (BWP) of the terminal may be used for resource allocation. As shown in Table 2, the 5G base station gNB may be semi-statically configured to use first Configuration 1 or second Configuration 2 to determine the RBG size. It can be seen from Table 2 that Configuration 2 has a greater scheduling granularity than Configuration 1.

TABLE 2

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Through the description of the frequency domain resource allocation types in the above-mentioned related art, it can be seen that if the frequency domain resource allocation types are configured semi-statically, the dynamic switching between resource allocation types cannot be realized, and the terminal cannot effectively support different types of services at the same time; while in order to achieve dynamic switching, a separate indicator needs to be carried in the DCI for indication, thereby increasing the signaling overhead of the DCI. In order to solve or avoid the occurrence of these two defects, this application proposes the following embodiments.

First Embodiment

Figure 1:
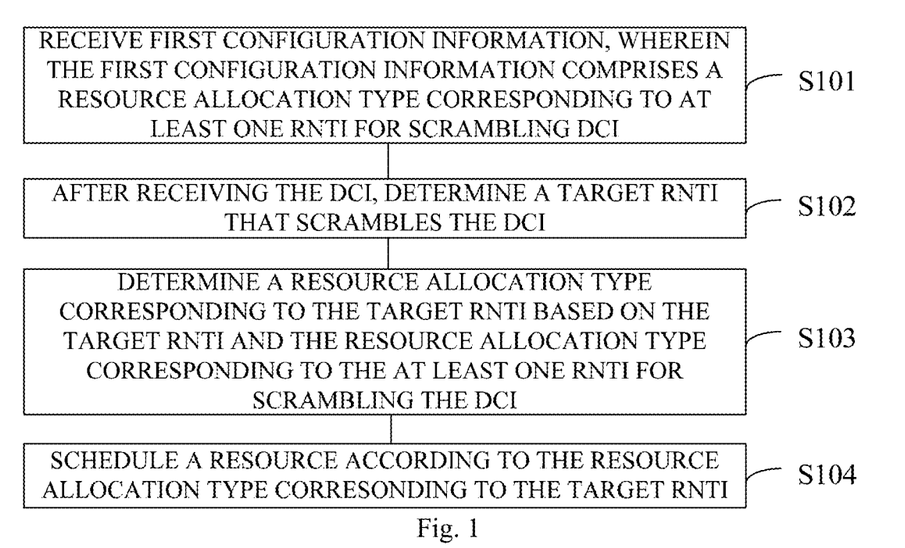
FIG. 1 is a schematic flowchart of a method for scheduling a resource provided by an embodiment of the present disclosure.

Referring to FIG. 1, which shows a method for scheduling a resource provided by an embodiment of the present disclosure, the method may be applied to a terminal device, and the method may include the following steps.

In S101: first configuration information is received; where the first configuration information includes a resource allocation type corresponding to at least one radio network temporary identity (RNTI, Radio Network Temporary Identity) used for scrambling downlink control information (DCI).

In S102: after receiving the DCI, a target RNTI that scrambles the DCI is determined.

In S103: a resource allocation type corresponding to the target RNTI is determined based on the target RNTI and the resource allocation type corresponding to the at least one RNTI used for scrambling the DCI.

In S104: a resource is scheduled according to the resource allocation type corresponding to the target RNTI.

From the technical solution shown in FIG. 1, it can be seen that in the present embodiment, DCI is used to indicate the resource allocation type, thereby enabling dynamic scheduling for the resource allocation type. In addition, the specific indication method does not adopt the form of carrying an indicator in the DCI. Instead, the RNTI that scrambles the DCI is used to implicitly indicate the resource allocation type corresponding to the RNTI. Therefore, the signaling consumption of DCI is reduced. It can be seen from this that the technical solution of the embodiment can dynamically adopt different resource allocation types according to different types of services without increasing the signaling overhead of DCI. For example, Type 0 resource allocation type is used for enhance Mobile BroadBand (eMBB) services for more flexible frequency domain resource allocation, and Type 1 resource allocation type is used for Ultra Reliable & Low Latency Communication (URLLC) services for continuous frequency domain resource allocation of large bandwidth, so as to optimize resource allocation for eMBB and URLLC services respectively, improve the resource utilization of 5G systems, and better support a UE to run eMBB and URLLC services at the same time.

For the technical solution shown in FIG. 1, it should be noted that the DCI received by the terminal may be either the DCI used for scheduling downlink resources or the DCI used for scheduling uplink resources, which is not elaborated herein.

For the technical solution shown in FIG. 1, because RNTI can include multiple types, such as Service Radio Network Controller (RNC) RNTI (i.e., S-RNTI), Devolve RNC RNTI (i.e., D-RNTI), Cell RNTI (C-RNTI), Universal Mobile Telecommunications System (UMTS) Terrestrial Radio Access Network (UTRAN) RNTI (i.e., u-RNTI), Downlink Shared CHannel (DSCH) RNTI (i.e., DSCH-RNTI) and so on. Then the corresponding resource allocation types can be configured for these RNTIs. Taking two RNTIs of the above-mentioned multiple RNTIs as an example, in a possible implementation manner, the first configuration information includes at least first indication information and second indication information; where the first indication information indicates the first resource allocation type corresponding to the first RNTI used to scramble the DCI; and the second indication information indicates the second resource allocation type corresponding to the second RNTI used to scramble the DCI.

It should be noted that, in the foregoing implementation manner, the first RNTI and the second RNTI are two different types of RNTI. In this embodiment, preferably, the first RNTI includes a cell radio network temporary identifier (C-RNTI); and the second RNTI includes other types of RNTI besides the C-RNTI.

In addition, for the resource allocation types respectively corresponding to the first RNTI and the second RNTI, specifically, the first resource allocation type is Type 0 resource allocation type, and the second resource allocation type is Type 1 resource allocation type; or, the first resource allocation type is Type 1 resource allocation type, and the second resource allocation type is Type 0 resource allocation type; where the Type 0 resource allocation type uses a bitmap to indicate frequency domain resources composed of a resource block group (RBG), and the Type 1 resource allocation type is used to indicate continuous frequency domain resources.

For the technical solution shown in FIG. 1, combining multiple types of RNTI in the foregoing implementation manner, in a possible implementation manner, the first configuration information includes at least first indication information and second indication information; where the first indication information indicates a general resource allocation type corresponding to a preset RNTI used for scrambling DCI; and the second indication information indicates the second resource allocation type corresponding to the second RNTI used for scrambling the DCI other than the preset RNTI.

It should be noted that in the process of configuring the RNTI and the corresponding resource allocation type, the preset multiple types of RNTI can be configured to correspond to one common resource allocation type, and then the RNTI other than the preset multiple types of RNTI is configured as a separate resource allocation type. For example, for the five types of RNTI, S-RNTI, D-RNTI, C-RNTI, u-RNTI, and DSCH-RNTI, it can be preset for S-RNTI, D-RNTI, C-RNTI, and u-RNTI to adopt a common resource allocation type, for example, for these four RNTIs, Type 0 resource allocation type is universally used; and for DSCH-RNTI, it corresponds to a separate resource allocation type, such as Type 1 resource allocation type.

The above two implementation methods respectively illustrate the two processes for configuring the corresponding relationship between RNTI and resource allocation type. After the configuration is completed, the terminal can determine the resource allocation type implicitly indicated by the target RNTI according to the target RNTI scrambling the DCI and the configured corresponding relationship. However, in order to be compatible with the current scheme of indicating the resource allocation type in the related art, for the technical solution shown in FIG. 1, in a possible implementation manner, before receiving the DCI scrambled by the second RNTI, the method also includes:

receiving second configuration information; where the second configuration information is used to indicate whether the second RNTI is available.

It should be noted that in this implementation manner, the second configuration information can be considered as an "enable" signal indicating that the second RNTI is available. When the second RNTI is available, the terminal can determine the resource allocation type implicitly indicated by the target RNTI scrambling the DCI through the configured resource allocation types corresponding to different RNTIs according to the technical solution shown in FIG. 1. Based on this, in this implementation manner, preferably, corresponding to the second configuration information indicating that the second RNTI is available, the step of determining the resource allocation type corresponding to the target RNTI based on the target RNTI and the resource allocation type according to at least one RNTI used to scramble the DCI includes:

corresponding to the target RNTI being the first RNTI, determining that the resource allocation type corresponding to the target RNTI is the first resource allocation type;

corresponding to the target RNTI being the second RNTI, determining that the resource allocation type corresponding to the target RNTI is the second resource allocation type.

In this implementation manner, preferably, corresponding to the second configuration information used to indicate that the second RNTI is not available, the method further includes:

scheduling the resource according to the first resource allocation type corresponding to the first RNTI.

In this implementation, the second configuration information may carry a specific value to identify whether the second RNTI is available. For example, when the value carried in the second configuration information is a first value, it indicates that the second RNTI is unavailable; and when the value carried in the second configuration information is a second value, it indicates that the second RNTI is unavailable.

Through the method for scheduling a resource provided in this embodiment, the DCI is used to indicate the resource allocation type, so that dynamic scheduling for the resource allocation type can be realized. In addition, the specific indication method does not use the form of carrying an indicator by DCI, instead, the RNTI that scrambles the DCI is used to implicitly indicate the resource allocation type corresponding to the RNTI, thereby reducing the signaling consumption of the DCI. It can be seen from this that the technical solution of this embodiment can not only realize dynamic switching between multiple frequency domain resource allocation types, but also reduce the DCI signaling overhead.

Second Embodiment

Figure 2:
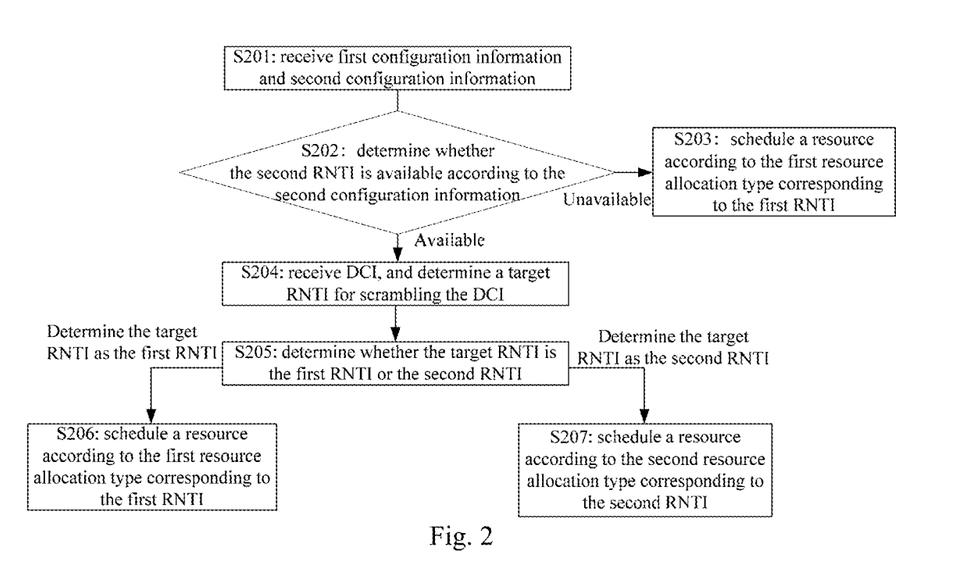
FIG. 2 is a schematic diagram of a detailed implementation process of a method for scheduling a resource provided by an embodiment of the present disclosure.

Based on the same inventive concept of the foregoing embodiment, referring to FIG. 2, which shows a detailed implementation process of a method for scheduling a resource provided by an embodiment of the present disclosure. In this embodiment, for example, the specific resource allocation types corresponding to two RNTIs are configured, the process shown in FIG. 2 may include the following steps.

In S201: first configuration information and second configuration information are received.

The first configuration information includes first indication information and second indication information; where the first indication information indicates the first resource allocation type corresponding to the first RNTI used to scramble the DCI; the second indication information indicates the second resource allocation type corresponding to the second RNTI used for scrambling the DCI; and the second configuration information is used to indicate whether the second RNTI is available.

In S202: it is determined whether the second RNTI is available according to the second configuration information.

If the second RNTI is not available, the process goes to S203; otherwise, the process goes to S204.

In S203: a resource is scheduled according to the first resource allocation type corresponding to the first RNTI.

In S204: DCI is received, and a target RNTI that scrambles the DCI is determined.

In S205: it is determined whether the target RNTI is the first RNTI or the second RNTI.

If it is determined that the target RNTI is the first RNTI, then the process goes to S206: scheduling a resource according to the first resource allocation type corresponding to the first RNTI.

If it is determined that the target RNTI is the second RNTI, then the process goes to S207: scheduling a resource according to the second resource allocation type corresponding to the second RNTI.

In addition, for the technical solution shown in FIG. 2, if the first configuration information includes at least first indication information and second indication information; where the first indication information indicates a general resource allocation type corresponding to the preset RNTI for scrambling DCI; the second indication information indicates the second resource allocation type corresponding to the second RNTI other than the preset RNTI used for scrambling the DCI, then, when the second RNTI is available, when the target RNTI that scrambles the DCI is the preset RNTI, scheduling is performed according to the general resource allocation type; and when the target RNTI that scrambles the DCI is a second RNTI other than the preset RNTI, scheduling is performed according to the second resource allocation type corresponding to the second RNTI. In the case that the second RNTI is not available, scheduling is directly performed according to the general resource allocation type.

Third Embodiment

Figure 3:
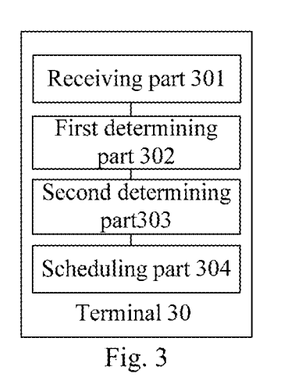
FIG. 3 is a schematic diagram of a composition of a terminal provided by an embodiment of the present disclosure.

Based on the same inventive concept of the foregoing embodiment, referring to FIG. 3, which shows the composition of a terminal 30 provided by an embodiment of the present disclosure, the terminal 30 includes: a receiving part 301, a first determining part 302, a second determining part 303, and a scheduling part 304.

The receiving part 301 is configured to receive first configuration information; where the first configuration information includes a resource allocation type corresponding to at least one radio network temporary identifier (RNTI) used to scramble downlink control information (DCI).

The first determining part 302 is configured to determine a target RNTI that scrambles the DCI after the receiving part 301 receives the DCI.

The second determining part 303 is configured to determine the resource allocation type corresponding to the target RNTI based on the target RNTI and the resource allocation type corresponding to the at least one RNTI used for scrambling DCI.

The scheduling part 304 is configured to schedule a resource according to the resource allocation type corresponding to the target RNTI.

In the above solution, the first configuration information includes at least first indication information and second indication information; where the first indication information indicates the first resource allocation type corresponding to the first RNTI used to scramble the DCI; and the second indication information indicates the second resource allocation type corresponding to the second RNTI used to scramble the DCI.

In the above solution, the first resource allocation type is Type 0 resource allocation type, and the second resource allocation type is Type 1 resource allocation type; or, the first resource allocation type is Type 1 resource allocation type, and the second resource allocation type is Type 0 resource allocation type; where the Type 0 resource allocation type uses a bitmap to indicate frequency domain resources composed of a resource block group (RBG), and the Type 1 resource allocation type is used to indicate continuous frequency domain resources.

In the above solution, the first RNTI includes a cell radio network temporary identification (C-RNTI); and the second RNTI includes other types of RNTIs except the C-RNTI.

In the above solution, the first configuration information includes at least first indication information and second indication information; where the first indication information indicates a general resource allocation type corresponding to a preset RNTI used for scrambling DCI; and the second indication information indicates the second resource allocation type corresponding to the second RNTI other than the preset RNTI used for scrambling the DCI.

In the above solution, the DCI includes DCI used for scheduling downlink resources or DCI used for scheduling uplink resources.

In the above solution, the receiving part 301 is further configured to receive second configuration information; where the second configuration information is used to indicate whether the second RNTI is available.

In the above solution, corresponding to the second configuration information used to indicate that the second RNTI is available, the second determining part 303 is configured to:

corresponding to the target RNTI being the first RNTI, determining that the resource allocation type corresponding to the target RNTI is the first resource allocation type; and corresponding to the target RNTI being the second RNTI, determining that the resource allocation type corresponding to the target RNTI is the second resource allocation type.

In the above solution, corresponding to the second configuration information used to indicate that the second RNTI is not available, the scheduling part 304 is also used to schedule resources according to the first resource allocation type corresponding to the first RNTI.

It is understandable that in this embodiment, "part" may be a part of a circuit, a part of a processor, a part of a program or software, etc., or it may also be a unit, a module, or is not modularized.

In addition, the various components in this embodiment may be integrated into one processing unit, or each unit may exist alone physically, or two or more units may be integrated into one unit. The above-mentioned integrated unit can be implemented in the form of hardware or software functional module.

The integrated unit may be stored in a non-transitory computer-readable storage medium if being implemented in the form of a software function module and not sold or used as an independent product. Based on such understanding, the essence of the technical solutions of the embodiments of the present disclosure, or the part contributing to the prior art, or all or part of the technical solution, may be embodied in the form of a software product which is stored in a storage medium including a number of instructions such that a computer device (which may be a personal computer, a server, or a network device, etc.) or a processor performs all or part of the method described in the embodiments of the present disclosure. The foregoing storage medium includes: any medium that is capable of storing program codes, such as a USB disk, a mobile hard disk drive, a Read Only Memory (ROM), a Random Access Memory (RAM), a magnetic disk or an optical disc, etc.

Therefore, the embodiments provide a non-transitory computer-readable storage medium, which may specifically be a non-transitory computer-readable storage medium, and the computer-readable storage medium stores a resource scheduling program that implements the steps of the method for scheduling a resource described in the above-mentioned first and second embodiments when the resource scheduling program is executed by at least one processor.

Figure 4:
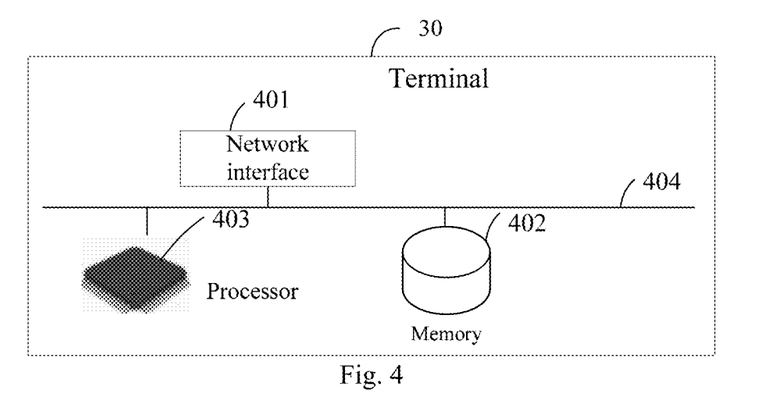
FIG. 4 is a schematic diagram of a specific hardware structure of a terminal provided by an embodiment of the present disclosure.

Based on the foregoing terminal 30 and the computer-readable storage medium, referring to FIG. 4, which shows a specific hardware structure of a terminal 30 provided by an embodiment of the present disclosure, the terminal includes: a network interface 401, a memory 402, and a processor 403; individual components are coupled together through a bus system 404. It can be understood that the bus system 404 is used to implement connection and communication between these components. In addition to the data bus, the bus system 404 also includes a power bus, a control bus, and a status signal bus. However, for clarity of description, various buses are marked as the bus system 404 in FIG. 4. Among them, the network interface 401 is configured to receive and send signals in the process of sending and receiving information with other external network element.

The memory 402 is configured to store a computer program that can run on the processor 403.

The processor 403 is configured to, when the computer program is running, execute:

receiving first configuration information; where the first configuration information includes a resource allocation type corresponding to at least one radio network temporary identifier (RNTI) used to scramble downlink control information (DCI);

after receiving the DCI, determining a target RNTI that scrambles the DCI;

determining the resource allocation type corresponding to the target RNTI based on the target RNTI and the resource allocation type corresponding to the at least one RNTI used for scrambling the DCI; and scheduling the resource according to the resource allocation type corresponding to the target RNTI.

It can be understood that the memory 402 in the embodiments of the present disclosure may be a volatile memory or a non-volatile memory, or may include both volatile and non-volatile memories. Among them, the non-volatile memory can be a Read-Only Memory (ROM), a Programmable ROM (PROM), an Erasable PROM (EPROM), and an Electrically EPROM (EEPROM) or a flash memory. The volatile memory may be a Random Access Memory (RAM), which is used as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The memory 402 of the systems and methods described herein is intended to include, but is not limited to, these and any other suitable types of memory.

The processor 403 may be an integrated circuit chip with signal processing capability. In the implementation process, the steps of the foregoing method can be completed by hardware integrated logic circuits or instructions in the form of software in the processor 403. The aforementioned processor 403 may be a general-purpose processor, a Digital Signal Processor (DSP), an Application Specific Integrated Circuit (ASIC), a Field Programmable Gate Array (FPGA), or other programmable logic devices, discrete gate or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module can be located in a mature storage medium in the art, such as a random access memory, a flash memory, a read-only memory, a programmable read-only memory, or an electrically erasable programmable memory, and a register. The storage medium is located in the memory 402, and the processor 403 reads the information in the memory 402, and completes the steps of the foregoing method in combination with its hardware.

It can be understood that the embodiments described herein can be implemented by hardware, software, firmware, middleware, microcode, or a combination thereof. For hardware implementation, the processing unit can be implemented in one or more Application Specific Integrated Circuits (ASIC), Digital Signal Processing (DSP), DSP Device (DSPD), Programmable Logic Device (PLD), Field-Programmable Gate Array (FPGA), general-purpose processors, controllers, microcontrollers, microprocessors, and other electronic unit or its combination for performing the functions described in this application.

For software implementation, the technology described herein can be implemented by modules (such as procedures, functions, etc.) that perform the functions described herein. The software codes can be stored in the memory and executed by the processor. The memory can be implemented in the processor or external to the processor.

Specifically, the processor 403 in the terminal 30 is further configured to execute the method steps described in the foregoing first embodiment or second embodiment when running the computer program, and details are not described herein again.

It should be noted that the technical solutions described in the embodiments of the present disclosure can be combined arbitrarily if there is no conflict.

The above are only the preferred embodiments of the present disclosure, and are not used to limit the protection scope of the present disclosure.

INDUSTRIAL APPLICABILITY

In the embodiments of the present disclosure, the DCI is used to indicate the resource allocation type, so that dynamic scheduling for the resource allocation type can be realized. In addition, the specific indication method does not use the form of carrying an indicator by DCI, but uses the RNTI for scrambling the DCI to implicitly indicate the resource allocation type corresponding to the RNTI, thereby reducing DCI signaling consumption. It can be seen from this that the technical solution of the embodiment of the present disclosure can not only realize the dynamic switching between multiple frequency domain resource allocation types, but also reduce the DCI signaling overhead.

What is claimed is:

1. A method for scheduling a resource, applied to a terminal device, the method comprising:
   receiving first configuration information, wherein the first configuration information comprises a resource allocation type corresponding to at least one radio network temporary identifier (RNTI) used for scrambling downlink control information (DCI);
   after receiving the DCI, determining a target RNTI that scrambles the DCI;

determining the resource allocation type corresponding to the target RNTI based on the target RNTI and the resource allocation type corresponding to the at least one RNTI used for scrambling the DCI; and scheduling the resource according to the resource allocation type corresponding to the target RNTI;

wherein the first configuration information comprises at least first indication information and second indication information; wherein the first indication information indicates a first resource allocation type corresponding to a first RNTI used for scrambling the DCI; and the second indication information indicates a second resource allocation type corresponding to a second RNTI used for scrambling the DCI; and wherein before receiving the DCI scrambled by the second RNTI, the method further comprises: receiving second configuration information; wherein the second configuration information is used to indicate whether the second RNTI is available.

2. The method according to claim 1, wherein the first resource allocation type is a Type 0 resource allocation type, and the second resource allocation type is a Type 1 resource allocation type; or, the first resource allocation type is a Type 1 resource allocation type, and the second resource allocation type is a Type 0 resource allocation type;

wherein the Type 0 resource allocation type uses a bitmap to indicate frequency domain resources composed of a resource block group (RBG), and the Type 1 resource allocation type is used to indicate continuous frequency domain resources.

3. The method according to claim 1, wherein the first RNTI comprises a cell radio network temporary identification (C-RNTI); and the second RNTI comprises other type of RNTI except the C-RNTI.

4. The method according to claim 1, wherein the DCI comprises DCI for scheduling a downlink resource or DCI used for scheduling an uplink resource.

5. The method according to claim 1, wherein corresponding to the second configuration information indicating that the second RNTI is available, the determining the resource allocation type corresponding to the target RNTI based on the target RNTI and the resource allocation type corresponding to the at least one RNTI used for scrambling the DCI comprises:

corresponding to the target RNTI being the first RNTI, determining that the resource allocation type corresponding to the target RNTI is the first resource allocation type; and corresponding to the target RNTI being the second RNTI, determining that the resource allocation type corresponding to the target RNTI is the second resource allocation type.

6. The method according to claim 1, wherein corresponding to the second configuration information indicating that the second RNTI is unavailable, the method further comprises:

scheduling the resource according to the first resource allocation type corresponding to the first RNTI.

7. A terminal, comprising: a network interface, a memory and a processor; wherein the network interface is configured to receive and send a signal in a process of sending and receiving information with a network element;

the memory is configured to store a computer program that, when running on the processor, cause the processor to:

receive first configuration information, wherein the first configuration information comprises a resource allocation type corresponding to at least one radio network temporary identifier (RNTI) used for scrambling downlink control information (DCI);

determine a target RNTI that scrambles the DCI after the receiving part receives the DCI;

determine the resource allocation type corresponding to the target RNTI based on the target RNTI and the resource allocation type corresponding to the at least one RNTI used for scrambling DCI; and schedule the resource according to the resource allocation type corresponding to the target RNTI;

wherein the first configuration information comprises at least first indication information and second indication information; wherein the first indication information indicates a first resource allocation type corresponding to a first RNTI used for scrambling the DCI; and the second indication information indicates a second resource allocation type corresponding to a second RNTI used for scrambling the DCI; and wherein the processor is further configured to, before the DCI scrambled by the second RNTI is received, receive second configuration information; and wherein the second configuration information is used to indicate whether the second RNTI is available.

8. The terminal according to claim 7, wherein the first resource allocation type is a Type 0 resource allocation type, and the second resource allocation type is a Type 1 resource allocation type; or, the first resource allocation type is a Type 1 resource allocation type, and the second resource allocation type is a Type 0 resource allocation type;

wherein the Type 0 resource allocation type uses a bitmap to indicate frequency domain resources composed of a resource block group (RBG), and the Type 1 resource allocation type is used to indicate continuous frequency domain resources.

9. The terminal according to claim 7, wherein the first RNTI comprises a cell radio network temporary identification (C-RNTI); and the second RNTI comprises other type of RNTI except the C-RNTI.

10. The terminal according to claim 7, wherein the DCI comprises DCI for scheduling a downlink resource or DCI for scheduling an uplink resource.

11. The terminal according to claim 7, wherein corresponding to the second configuration information indicating that the second RNTI is available, the processor is further configured to:

corresponding to the target RNTI being the first RNTI, determine that the resource allocation type corresponding to the target RNTI is the first resource allocation type; and corresponding to the target RNTI being the second RNTI, determine that the resource allocation type corresponding to the target RNTI is the second resource allocation type.

12. The terminal according to claim 7, wherein corresponding to the second configuration information indicating that the second RNTI is unavailable, the processor is further configured to schedule the resource according to the first resource allocation type corresponding to the first RNTI.

13. A non-transitory computer-readable storage medium storing a computer program for scheduling a resource, which when executed by at least one processor, implements the steps of:

receiving first configuration information; wherein the first configuration information comprises a resource allocation type corresponding to at least one radio network temporary identifier (RNTI) used for scrambling downlink control information (DCI);
after receiving the DCI, determining a target RNTI that scrambles the DCI;
determining the resource allocation type corresponding to the target RNTI based on the target RNTI and the resource allocation type corresponding to the at least one RNTI used for scrambling the DCI; and
scheduling the resource according to the resource allocation type corresponding to the target RNTI;
wherein the first configuration information comprises at least first indication information and second indication information; wherein the first indication information indicates a first resource allocation type corresponding to a first RNTI used for scrambling the DCI; and the second indication information indicates a second resource allocation type corresponding to a second RNTI used for scrambling the DCI; and
wherein before receiving the DCI scrambled by the second RNTI, the method further comprises: receiving second configuration information, wherein the second configuration information is used to indicate whether the second RNTI is available.

* * * * *